March 30, 1943.  N. SORENSON  2,314,905
HARVESTER CUTTER BAR
Filed Sept. 29, 1941
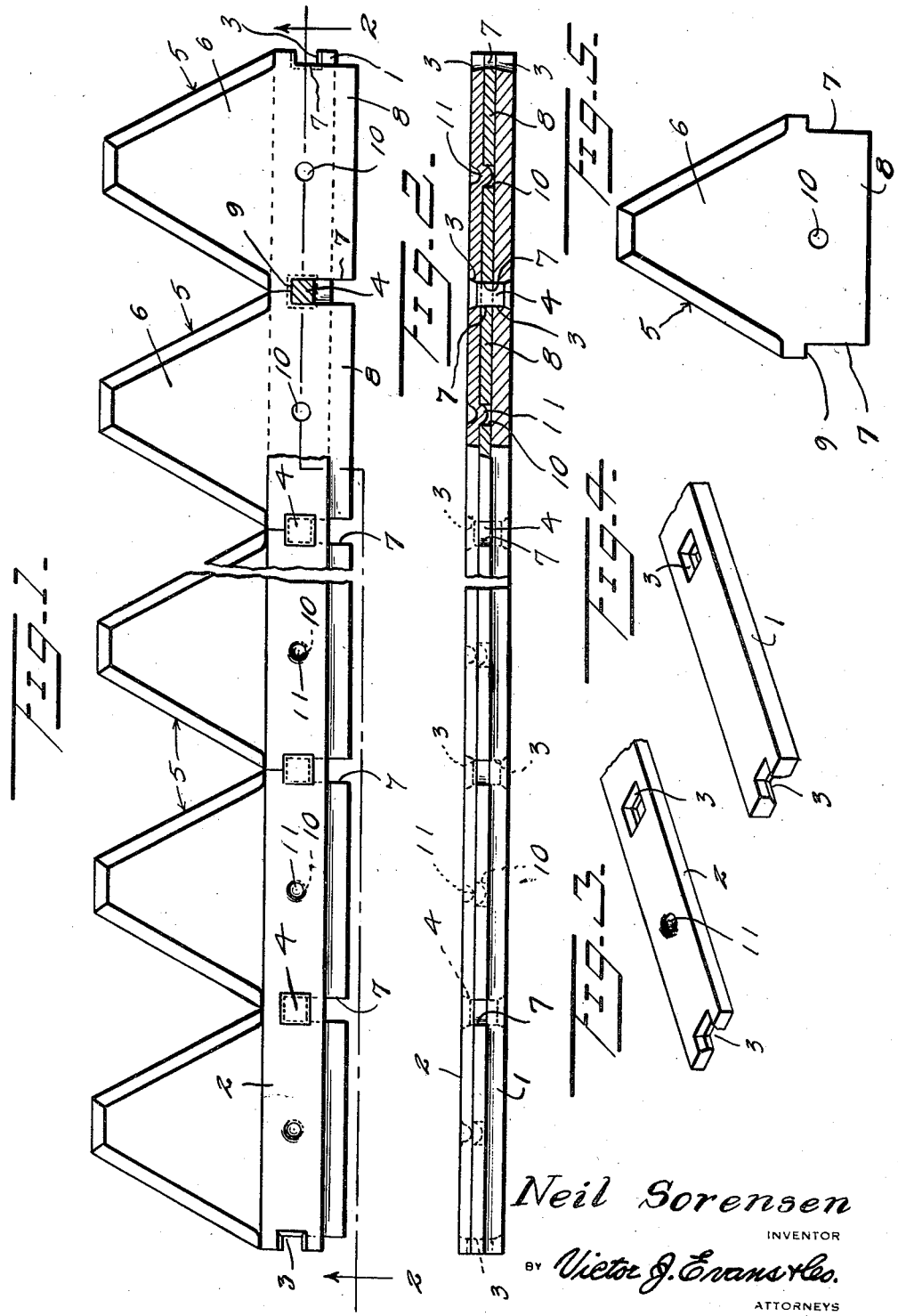
Neil Sorensen
INVENTOR
BY Victor J. Evans & Co.
ATTORNEYS Patented Mar. 30, 1943

2,314,905

UNITED STATES PATENT OFFICE 2,314,905

HARVESTER CUTTER BAR

Neil Sorenson, Salt Lake City, Utah

Application September 29, 1941, Serial No. 412,852

4 Claims. (Cl. 56—300)

This invention relates to cutter bars of the reciprocatory type used on mowing machines, reapers and like harvesters, and its general object is to provide a cutter bar that includes spaced superimposed or upper and lower bar sections to fittingly receive the cutting blades between the same, and the blades may be permanently or detachably fixed to at least one of the sections, but in any event, the provision of the double bar member, together with the association of the blades therewith, materially reduce breakage or damage to the cutter bar.

A further object is to provide a cutter bar that includes superimposed spaced bar sections fastened together by suitable means at regular intervals along the length thereof to provide seats for detachably receiving the blades which can be applied and removed in an easy and expeditious manner, yet casual removal or displacement is practically impossible.

Another object is to provide a cutter bar of the character set forth, that is capable of fitting guards now in general use, and the cutter bar is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a fragmentary top plan view of the cutter bar which forms the subject matter of the present invention, with parts broken away and in section.

Figure 2 is a sectional view taken approximately on line 2—2 of Figure 1, looking in the direction of the arrows.

Figure 3 is a perspective view of a fragmentary portion of the upper bar section.

Figure 4 is a similar view of a fragmentary portion of the lower bar section.

Figure 5 is a top plan view of one of the cutting blades.

Referring to the drawing in detail, the reference numeral 1 indicates the lower bar section and 2 the upper bar section, the sections being substantially flat, and while only a fragmentary portion of the cutter bar is shown, it will be obvious that it is made in various lengths to fit and be mounted for reciprocation in guards of any length. Each of the sections in the form shown is provided with square cornered holes 3 disposed at equi-distantly spaced intervals in a row along the longitudinal center thereof, and the holes of the upper section register with those of the lower section to receive square shanked and headed rivets 4 that fasten the sections in spaced relation to each other or for relative movement, to provide seats between the same for receiving the cutting blades 5, and the heads of the rivets are of course countersunk in the sections, as best shown in Figure 2.

Each of the blades include a substantially triangular shaped cutting portion 6 having beveled edges and the rear corners of the blades are cut away to provide lateral recesses 7 extending forwardly from the rear edges of the blades for a portion of their length to form reduced rear portions 8 and abutment shoulders 9. A hole 10 is provided centrally between the ends of the reduced rear portion 8 and the upper section 2 has indentations extending therein from the upper face thereof to provide teats 11 extending below the lower face, to be mounted in the holes 10, as clearly shown on the right hand side of Figure 2.

From the above description and disclosure in the drawing, it will be obvious that in the form shown, the blades 5 are detachably secured to the bar sections and when in secured position, as will be noted in Figures 1 and 2, the reduced rear portions 8 are mounted in the seats between the rivets and the sections, with the shoulders 9 abutting the front faces of the shanks of the rivets to limit rearward movement of the blades, while the sides of the recesses abut the side faces of the shanks, and the teats are mounted in the holes 10. It will be further noted as best shown in Figure 1 that the portions of the blades between the cutting portions 6 and the reduced rear portions 8 are of a width so that the blades are disposed in edge to edge engagement, with the result it will be apparent that casual removal or displacement of the blades relative to the sections is practically impossible.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A cutter bar for harvesters, comprising upper and lower bar sections, fastening means disposed at regular intervals along the length of the sections and securing the sections together for disposal in spaced parallel relation to each other, cutting blades mounted between said sections for the latter to bear against the upper and lower faces of the blades, said blades abutting the fastening means and each other to prevent lateral and rearward displacement of said blades, and means for locking the blades to at least one of the sections against lateral movement.

2. A cutter bar for harvesters, comprising upper and lower bar sections, fastening means disposed at regular intervals along the length of the sections and securing the latter together for disposal in spaced parallel relation to each other to provide seats between the same, blades including beveled substantially triangular shaped cutting portions and being laterally recessed from their rear ends to provide reduced rear portions and shoulders at the forward ends of the recesses, said reduced rear portions being mounted in the seats with the shoulders and the side edges of the recesses abutting the fastening means to prevent rearward and lateral displacement of the blades, and means for detachably locking the blades in the seats.

3. A cutter bar for harvesters, comprising upper and lower bar sections, fastening means disposed at regular intervals along the length of the sections and securing the latter together for disposal in spaced parallel relation to each other to provide seats between the same, blades including beveled substantially triangular shaped cutting portions and being laterally recessed from their rear ends to provide reduced rear portions and shoulders at the forward ends of the recesses, said reduced rear portions being mounted in the seats with the shoulders and the side edges of the recesses abutting the fastening means to prevent rearward and lateral displacement of the blades, said reduced rear portions having holes therein, teats formed on and depending from the upper section and received in the holes to secure the blades to the sections, and said sections bearing against the upper and lower faces of said reduced rear portions.

4. A cutter bar for harvesters, comprising upper and lower bar sections, square cornered rivets disposed at regular intervals along the length of the sections for securing the latter together for disposal in spaced parallel relation to each other to provide seats between the same, blades including beveled substantially triangular shaped cutting portions, said blades having square cornered recesses extending from the sides and rear edges thereof to provide reduced rear portions and shoulders at the forward ends of the recesses, said reduced rear portions being mounted in the seats with the shoulders and side edges of the recesses abutting the rivets to prevent rearward and lateral displacement of the blades, and means for locking the blades to at least one of said sections against lateral movement.

NEIL SORENSON.